(12) United States Patent
Thierbach et al.

(10) Patent No.: US 11,073,432 B2
(45) Date of Patent: Jul. 27, 2021

(54) FORCE SENSOR, IN PARTICULAR SUITABLE FOR AN ELECTROHYDRAULIC HITCH CONTROL SYSTEM OF AN AGRICULTURAL TRACTOR

(71) Applicant: Robert Bosch GmbH, Stuttgart (DE)

(72) Inventors: Peter Thierbach, Ludwigsburg (DE); Steffen Klein, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 365 days.

(21) Appl. No.: 15/674,243

(22) Filed: Aug. 10, 2017

(65) Prior Publication Data

US 2018/0067001 A1 Mar. 8, 2018

(30) Foreign Application Priority Data

Aug. 12, 2016 (DE) .................... 10 2016 215 071.5

(51) Int. Cl.
*G01L 1/12* (2006.01)
*G01L 5/00* (2006.01)
*A01B 61/02* (2006.01)
*A01B 63/11* (2006.01)
*G01L 5/13* (2006.01)
*G01L 1/04* (2006.01)
(Continued)

(52) U.S. Cl.
CPC ............... *G01L 1/12* (2013.01); *A01B 61/02* (2013.01); *A01B 63/11* (2013.01); *G01L 1/044* (2013.01); *G01L 1/122* (2013.01); *G01L 5/0004* (2013.01); *G01L 5/136* (2013.01); *A01B 59/069* (2013.01); *A01B 63/00* (2013.01); *A01B 63/111* (2013.01)

(58) Field of Classification Search
CPC .... G01D 5/22; G01L 1/14; G01L 5/13; G01L 5/136; Y10S 73/03; B60N 2/002; G01G 19/4142; B60R 21/01516
See application file for complete search history.

(56) References Cited

U.S. PATENT DOCUMENTS 4,456,074 A * 6/1984 Prudenziati ............. G01L 5/136
172/7
4,982,613 A * 1/1991 Becker ...................... G01L 1/14
172/7
(Continued)

FOREIGN PATENT DOCUMENTS

CN 103063341 A 4/2013
DE 35 15 126 A1 10/1986
(Continued)

OTHER PUBLICATIONS

Chinese Search Report corresponding to Chinese Patent Application No. 201710685966.7, dated Aug. 7, 2020 (3 pages).

*Primary Examiner* — Brandi N Hopkins
(74) *Attorney, Agent, or Firm* — Maginot, Moore & Beck LLP

(57) ABSTRACT

A force sensor is suitable for an electrohydraulic hitch control system of an agricultural tractor. The force sensor has an outer cylindrical part with a bore and a measuring rod fixed on one side in the bore. A central section of the cylindrical part is provided as force introduction section. Two outer sections of the cylinder part are removed equally far axially from the center of the force introduction section and are provided as abutment sections. The measuring rod is clamped in an area of the force introduction section.

16 Claims, 1 Drawing Sheet

(51) Int. Cl.
*A01B 63/111* (2006.01)
*A01B 59/06* (2006.01)
*A01B 63/00* (2006.01)

(56) References Cited

U.S. PATENT DOCUMENTS

| | | | |
|---|---|---|---|
| 6,813,966 B2* | 11/2004 | Dukart | G01L 1/14 |
| | | | 73/862.69 |
| 6,986,293 B2* | 1/2006 | Dukart | B60N 2/002 |
| | | | 73/862.391 |
| 2004/0255687 A1* | 12/2004 | Dukart | B60N 2/002 |

FOREIGN PATENT DOCUMENTS

| | | | | |
|---|---|---|---|---|
| DE | 37 00 835 A1 | 7/1988 | | |
| DE | 102 42 250 A1 | 3/2004 | | |
| DE | 102014013018 A1 * | 3/2016 | | F15B 15/202 |
| EP | 0 136 466 A1 | 4/1985 | | |
| EP | 0713637 A1 * | 5/1996 | | A01B 63/112 |

* cited by examiner

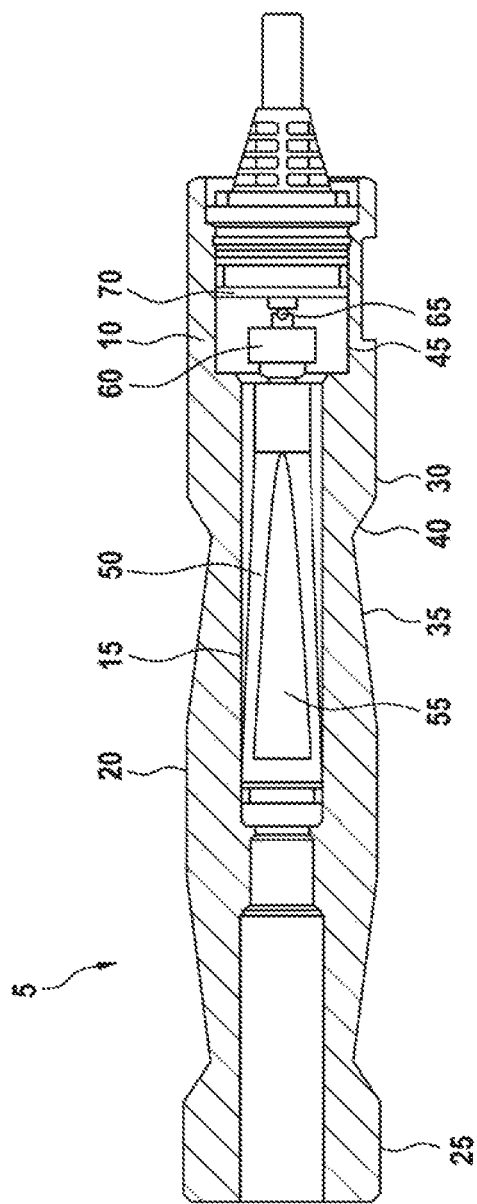

FORCE SENSOR, IN PARTICULAR SUITABLE FOR AN ELECTROHYDRAULIC HITCH CONTROL SYSTEM OF AN AGRICULTURAL TRACTOR

This application claims priority under 35 U.S.C. § 119 to patent application number DE 10 2016 215 071.5, filed on Aug. 12, 2016 in Germany, the disclosure of which is incorporated herein by reference in its entirety.

BACKGROUND

The disclosure relates to a force sensor for use in electrohydraulic control loops, in particular in electrohydraulic hitch control systems.

Such force sensors are also designated force measuring bolts and are based on a mechanical bending beam principle. An outer cylindrical sleeve of the sensor is clamped in between two bearing shells, and an external force to be measured is introduced at a force introduction section in the center of the cylindrical sleeve. The deformation of the cylindrical sleeve follows the bending line according to the mechanical bending of a double-mounted flat beam as a result of a single force acting in the center. A rigid measuring rod is clamped into the cylindrical sleeve. A sensor inserted into the cylindrical sleeve detects a position change of the measuring rod in relation to a plane radial to the longitudinal axis of the cylindrical sleeve.

The prior art discloses basically two possible ways of clamping the measuring rod into the cylindrical sleeve of the force measuring bolt. Firstly by means of clamping in on one side, secondly by clamping the rigid measuring rod on both sides into the outer cylindrical sleeve of the force measuring bolt.

DE 35 15 126 A1 shows a rigid measuring rod clamped firmly into the outer cylindrical sleeve at one end and a sensor used at the other end, which detects a position change of the measuring rod in relation to a plane radial to the longitudinal axis of the cylindrical housing.

In such a measuring rod clamped in on one side, the measuring principle mainly used is the detection of the position by means of a change in the air gap of a measuring coil through which alternating current flows.

As a result of being clamped in on one side, the rigid measuring rod is susceptible to vibrations.

Another generic force sensor is known, for example from DE 102 42 250 A1. Here, a rigid measuring rod located in an outer cylindrical housing is clamped in on both sides. Given clamping in on both sides, the position change of the rigid measuring rod in relation to the outer cylindrical housing of the force measuring bolt is lower than in the case of single-sided clamping-in. Use is made here both of the measuring principle of the detection of the position as a result of a change in the air gap of a measuring coil through which alternating current flows and of the detection of the position by means of a Hall sensor. A rigid measuring rod clamped in on both sides is less susceptible to vibrations. The output signal from the sensor is likewise nonlinear but not as highly as in the case of a measuring rod clamped in on one side.

Furthermore, on both sides, beside the region on which an external force F acts, the force measuring bolt has a rotationally symmetrical taper on the outer cylindrical housing. In the cross-sections of FIGS. 1 and 3 of DE 102 42 250 A, the configuration of the taper on the outer cylindrical housing can be seen clearly. As a result of the taper, the force measuring bolt forms a smaller resistance torque. As a result, the sensor becomes more sensitive. The force is introduced into a solid region that is not or little deformable. However, the shape of the taper is not optimal.

A force sensor must be capable of sustained operation in accordance with the requirements. Nevertheless, a signal level that is as high as possible and reproducible should be achieved.

According to the disclosure, this object is achieved by a force sensor which has the features according to the following description.

SUMMARY

The disclosure proposes a force sensor which is in particular suitable for an electrohydraulic hitch control system of an agricultural tractor. This force sensor has an outer cylindrical part with a bore and a rigid measuring rod fixed on one side in the bore. A central section of the cylindrical part is provided as force introduction section. Two outer sections removed equally far axially from the center of the force introduction section are provided as abutment sections. The rigid measuring rod is clamped in the area of the force introduction section.

As a result of the virtually central clamping in of the measuring rod in the area of the force introduction section of the outer cylindrical part, and the shorter length associated therewith as compared with clamping the measuring rod at the end into the outer cylindrical part, the measuring rod has a considerably higher resonant frequency, which advantageously leads to less signal interference in the system, and secondly the fatigue strength of the force sensor is increased, in particular at the force introduction section.

Further advantageous embodiments are the subject matter of the following description.

If, starting from the force introduction section, in the axial direction toward both sides, a conical section with decreasing material thickness of the wall of the cylindrical part and then a cone-shaped transition with increasing material thickness of the wall of the cylindrical part extends toward the abutment section, and the conical section with decreasing material thickness is longer than the cone-shaped transition with increasing material thickness, then the stresses in the material do not decrease toward the outside but remain virtually constant over the extent of the conical section. As a result, the conical section is deformed over virtually its entire length. The maximum stresses that occur do not increase. Given the same fatigue strength and alternating bending strength, a higher deflection of the central force introduction section is achieved. The shape of the outer contour can be optimized by simulation of the stress profiles by the finite element method. The fabrication of the shape of the outer contour of the cylindrical part needs no special tool but can be produced simply by means of NC machines.

If the ratio of the length of the conical section with decreasing material thickness to the length of the cone-shaped transition with increasing material thickness is at least 4/1, in particular at least 6/1 or 8/1 or 10/1, the maximum deflection of the outer cylindrical part and therefore a maximum measuring signal from the sensor can be achieved. The output signal from the sensor is virtually linear. A change in the measuring range or changed requirements on the fatigue strength can be produced easily by means of re-definition of the outer contour.

It is particularly advantageous if the change in the material thickness at least one of the transitions between force introduction section, conical section, cone-shaped transition and abutment section extends continuously, preferably in the form of rounding. This ensures that the sensor continues to have the same strength properties, in particular a high fatigue strength, and in particular material cracks are prevented.

If the rigid measuring rod has a conical shape and in particular is provided with at least two shoulders for a screw-in tool, then the measuring rod can easily be screwed into the outer cylindrical part with a prescribed tightening torque.

In a particularly advantageous refinement, a permanent magnet is fixed to the non-clamped end of the rigid measuring rod, and a Hall sensor is inserted into the receiving section of the cylindrical part. Thus, the sensor can very accurately detect the position change of the permanent magnet in relation to a plane radial to the longitudinal axis of the outer cylindrical part.

If a circuit board having evaluation electronics for the Hall sensor is inserted into a receiving section of the outer cylindrical part of the sensor, the sensor can evaluate the measuring signal very compactly and thus in a space-saving manner, convert the same to a standardized analog or digital interface and provide the same as actual value to a higher-order control system. In an advantageous way, said receiving section simultaneously serves to protect the circuit board against external contamination and moisture, for example in accordance with protection classes IP67 and IP67K.

If the evaluation electronics on the circuit board convert the sensor signal into an analog current/voltage signal which corresponds to an actual force signal or into a digital actual force signal, the sensor can easily be incorporated in a higher-order control loop.

It is particularly advantageous if the evaluation electronics on the circuit board include a field bus interface, in particular a CAN bus interface. Thus, the sensor can be incorporated simply and quickly into a higher-order digital electrohydraulic hitch control system.

BRIEF DESCRIPTION OF THE DRAWINGS

In the following text, an exemplary embodiment of the disclosure will be described in more detail by using the FIGURE.

The single FIGURE shows a sectional image of an embodiment of the force sensor according to the disclosure.

DETAILED DESCRIPTION

According to the FIGURE, a force sensor 5 according to an exemplary embodiment of the present disclosure comprises a cylindrical part 10, which has an axial bore 15 and is made from one piece.

The cylindrical part 10 has a force introduction section 20 in the center and, extending axially outward from the center on both sides, a conical section 35, a cone-shaped transition 40 and an abutment section 30. The conical section 35 is a section with an axially outwardly decreasing material thickness of the wall of the cylindrical part 10, the cone-shaped transition 40 is a section with an axially outwardly increasing material thickness of the wall of the cylindrical part 10.

The measuring force acts on the force introduction section 20 in the center of the cylindrical part 10 and is distributed outward via the two abutment sections 25, 30 to two bearing shells (not illustrated).

The change in the material thickness at the boundaries between force introduction section 20, conical section 35, cone-shaped transition 40 and abutment section 25, 30 takes place in the form of rounding. Therefore, material cracks brought about in particular by alternating force stresses are prevented. Two outer sections removed equally far axially from the center of the force introduction section 20 are formed as abutment sections 25, 30. The conical section 35 with decreasing material thickness is longer than the cone-shaped transition 40 with increasing material thickness. Therefore, the stresses in the material do not decrease toward the outside but remain virtually constant over the extent of the conical section 35. As a result of the conical section 35 with decreasing material thickness, the conical section 35 is deformed to the maximum permissible extent over virtually its entire length. The maximum stresses occurring do not increase. Given the same fatigue strength, a higher deflection of the central force introduction section 20 is achieved. As opposed to this, in the case of a cylindrical instead of a conical section, a measuring force acting on the force introduction section would effect deformation primarily in the area of the force introduction section because of the high rigidity of the cylindrical section. The greatest loading of the material occurs at the force introduction section and decreases toward the outside. However, in the force sensor 5 according to the disclosure, having a conical section 35 with decreasing material thickness, deformation is achieved over virtually the entire conical section 35. The summation of the deformation over the length of the conical section 35 ensures a higher deflection of the force introduction section 20. This deflection can be virtually linear with the introduced force. The maximum stress that occurs does not increase. The production of the outer contour of the cylindrical part 10 needs no special tool but can be produced simply by NC machines. The outlay on fabrication is low and therefore permits economical fabrication. The shape of the outer contour can be optimized by simulation of the stress profiles by the finite element method.

In the interior of the cylindrical part, a rigid measuring rod 50 is clamped in centrally. The measuring rod 50 has a conical shape and has two shoulders 55 for a screw-in tool. Therefore, the measuring rod 50 is screwed into the outer cylindrical part 10 in the area of the force introduction section 20 with a prescribed tightening torque. As a result of the central fixing of the measuring rod 50 in the outer cylindrical part 10, the measuring rod 50 is firstly less susceptible to vibrations because of its higher resonant frequency, and secondly, the fatigue strength of the force sensor is increased, in particular at the force introduction section 20. A permanent magnet 60 is fixed to the non-clamped end of the measuring rod 50. A Hall sensor 65 is inserted into the receiving section 45 of the cylindrical part 10 and detects the position change of the permanent magnet 60 in relation to a plane radial to the longitudinal axis of the outer cylindrical part 10. As a result of the action of an external force on the force introduction section 20, the cylindrical part 10 of the sensor 5 bends in such a way that the permanent magnet 60 makes a movement, which is detected by the Hall sensor 65 located above. The movement lies in the range of a few 0.1 mm.

A circuit board 70 having evaluation electronics for the Hall sensor 65 is inserted into a receiving section 45 of the outer cylindrical part 10 of the sensor 5 and converts the measuring signal to a standard analog or digital interface. The measuring signal is therefore provided to a higher-order control system or can easily be incorporated into a control loop as actual force value. The receiving section 45 simultaneously serves to protect the circuit board 70 against external contamination and moisture, for example in accordance with protection classes IP67 and IP67K. The evaluation electronics on the circuit board 70 can also include a field bus interface, in particular a CAN bus interface. The sensor can therefore be incorporated in a higher-order digital electrohydraulic hitch control system.

LIST OF DESIGNATIONS

5 Force sensor
10 Cylindrical part
15 Bore
20 Force introduction section
25 Abutment section
30 Abutment section
35 Conical section
40 Cone-shaped transition
45 Receiving section
50 Measuring rod
55 Shoulder for screw-in tool
60 Permanent magnet
65 Hall sensor
70 Circuit board

What is claimed is:

1. A force sensor, comprising:
an outer cylindrical part with a bore and a measuring rod fixed on one side in the bore; wherein:
a central section of the cylindrical part is a force introduction section,
two outer sections of the outer cylindrical part are abutment sections, the two outer sections are removed equally far axially from the center of the force introduction section, and
the measuring rod is clamped in the outer cylindrical part at an axial location of the force introduction section.

2. The force sensor according to claim 1, wherein the outer cylindrical part includes:
a first conical section extending from the force introduction section in a first axial direction, the first conical section having decreasing wall material thickness in the first axial direction;
a second conical section extending from the force introduction section in a second opposite axial direction, the second conical section having decreasing wall material thickness in the second axial direction;
a first cone-shaped transition extending from the first conical section toward a first one of the abutment sections, the first cone-shaped transition having increasing wall material thickness in the first axial direction; and
a second cone-shaped transition extending from the second conical section toward a second one of the abutment sections, the second cone-shaped transition having increasing wall material thickness in the second axial direction,
wherein the first and second conical sections each extend over an axial length that is longer than an axial length over which the corresponding first or second cone-shaped transition extends.

3. The force sensor according to claim 2, wherein a ratio of the axial length of the first and second conical sections to the axial length of the respective first or second cone-shaped transition is at least 4:1.

4. The force sensor according to claim 3, wherein
a change in material thickness extends continuously at at least one of: a transition between the force introduction section and the first and second conical sections; a transition between the first and second conical sections and the corresponding first or second cone-shaped transition; and a transition between the first and second cone-shaped transitions and the corresponding abutment section.

5. The force sensor according to claim 4, wherein the measuring rod has a conical shape in a section from a clamped region toward a non-clamped end.

6. The force sensor according to claim 5, wherein the measuring rod has at least two flattened shoulders configured for engagement by a screw-in tool.

7. The force sensor according to claim 4, further comprising:
a permanent magnet fixed to a non-clamped end of the measuring rod; and
a Hall sensor inserted into a receiving section of the cylindrical part, the Hall sensor configured to detect a position change of the permanent magnet in relation to a plane radial to a longitudinal axis of the outer cylindrical part.

8. The force sensor according to claim 7, further comprising:
a circuit board accommodated in the receiving section of the outer cylindrical part, the circuit board having evaluation electronics for the Hall sensor.

9. The force sensor according to claim 8, wherein the evaluation electronics on the circuit board are configured to convert a sensor signal into an analog current or voltage signal which corresponds to an actual force signal.

10. The force sensor according to claim 8, wherein the evaluation electronics on the circuit board are configured to convert a sensor signal into a digital actual force signal.

11. The force sensor according to claim 10, wherein the evaluation electronics on the circuit board include a field bus interface configured to enable the sensor to be incorporated into a higher-order digital electrohydraulic hitch control system.

12. The force sensor according to claim 11, wherein the field base interface is a CAN bus interface.

13. The force sensor according to claim 4, wherein change in material thickness is in the form of rounding.

14. The force sensor according to claim 3, wherein the ratio is at least 6:1, 8:1 or 10:1.

15. The force sensor according to claim 1, wherein the force sensor is configured for use with an electrohydraulic hitch control system of an agricultural tractor.

16. A force sensor, comprising:
a monolithic outer cylindrical part with a bore extending axially therethrough, the outer cylindrical part having a central section and two outer sections spaced equally far axially from a center of the central section; and
a measuring rod fixed in the bore at one of two axially spaced ends of the measuring rod, wherein:
the central section of the cylindrical part is a force introduction section that receives an external force to be measured by the force sensor,
the two outer sections are abutment sections configured to be fixed in position relative to one another, and
the measuring rod is clamped in the bore in at an axial location of the force introduction section.

* * * * *